US011232359B2

(12) United States Patent
Krishnapura Subbaraya et al.

(10) Patent No.: US 11,232,359 B2
(45) Date of Patent: *Jan. 25, 2022

(54) METHOD AND SYSTEM FOR IMPROVING PERFORMANCE OF AN ARTIFICIAL NEURAL NETWORK

(71) Applicant: Wipro Limited, Bangalore (IN)

(72) Inventors: Prashanth Krishnapura Subbaraya, Bengaluru (IN); Raghavendra Hosabettu, Bangalore (IN)

(73) Assignee: Wipro Limited, Bangalore (IN)

( * ) Notice: Subject to any disclaimer, the term of this patent is extended or adjusted under 35 U.S.C. 154(b) by 561 days.

This patent is subject to a terminal disclaimer.

(21) Appl. No.: 16/276,686

(22) Filed: Feb. 15, 2019

(65) Prior Publication Data

US 2020/0210835 A1     Jul. 2, 2020

(30) Foreign Application Priority Data

Dec. 27, 2018   (IN) .............................. 201841049415

(51) Int. Cl.
*G06N 3/08*     (2006.01)
*G06N 3/04*     (2006.01)

(52) U.S. Cl.
CPC .............. *G06N 3/082* (2013.01); *G06N 3/04* (2013.01)

(58) Field of Classification Search
CPC ................................ G06N 3/082; G06N 3/04
USPC .......................................................... 706/15
See application file for complete search history.

(56) References Cited

U.S. PATENT DOCUMENTS

2014/0079297 A1* 3/2014 Tadayon ............ G06K 9/00288
                                                     382/118
2019/0087729 A1* 3/2019 Byun .................... G06N 3/082

OTHER PUBLICATIONS

He, et al., "Reshaping Deep Neural Network for Fast Decoding by Node-Pruning", 2014 IEEE International Conference on Acoustic, Speech and Signal Processing (ICASSP), 2014 (Year: 2014).*

(Continued)

*Primary Examiner* — Tsu-Chang Lee
(74) *Attorney, Agent, or Firm* — Finnegan, Henderson, Farabow, Garrett & Dunner, LLP

(57) ABSTRACT

This disclosure relates to method and system for improving performance of an artificial neural network (ANN). The method may include receiving a weight matrix comprising an original weight of each neural node in each layer of the ANN. For each unique combination of at least two neural nodes in each layer, the method may further include determining a relative advantage value for one of the at least two neural nodes in a given layer with respect to remaining of the at least two neural nodes in the given layer based on actual inputs and standard inputs to the at least two neural nodes, and determining a modified weight of each of the at least two neural nodes based on the relative advantage value. The method may further include executing an elimination decision for each neural node in each layer based on a corresponding final modified weight, and updating the weight matrix based on the final modified weight of each remaining neural node in each layer. The final modified weight of a given neural node in a given layer is the modified weight of the given neural node upon exhausting each unique combination of the at least two neural nodes in the given layer.

17 Claims, 4 Drawing Sheets

(56) References Cited

OTHER PUBLICATIONS

Lin, J-S., et al., "Application of Artificial Neural Networks for Reduction of False-Positive Detections in Digital Chest Radiographs", AMIA, Inc. (1994), pp. 434-438.

* cited by examiner

METHOD AND SYSTEM FOR IMPROVING PERFORMANCE OF AN ARTIFICIAL NEURAL NETWORK

TECHNICAL FIELD

This disclosure relates generally to artificial neural network (ANN), and more particularly to method and system for improving performance of an ANN.

BACKGROUND

Artificial neural network (ANN) may be employed in a wide variety of applications, including, but not limited to, computer vision, image recognition, natural language processing, speech recognition, and decision making. An ANN may learn to perform a task by considering examples, generally without being programmed with any task-specific rules. For example, in image recognition, the ANN may learn to identify specific objects in images by analyzing example images that may or may not have such specific objects. The ANN is based on a collection of connected nodes called 'neural nodes' aggregated into one or more layers. The connections between 'neural nodes' are called 'edges'. Each of the 'neural nodes' and 'edges' may have a 'weight' that may adjust as learning proceeds.

The inability to clearly understand and explain the reason for a decision taken by the ANN is one of the main differences between artificial and human intelligence. As stated above, the ANN may usually provide an answer based on the data they have learned but not a reason for how it arrived to that answer. Thus, in many ANN based applications, it is difficult to find how the ANN made a specific decision. This limitations pose challenges in improving the decision making of the ANN or altering the decision making of the ANN so as to minimize false positives. It may, therefore, be desirable to understand and explain how an ANN came to a particular decision, so as to further improve the decision making of the ANN.

SUMMARY

In one embodiment, a method for improving performance of an artificial neural network (ANN) is disclosed. In one example, the method may include receiving a weight matrix comprising an original weight of each neural node in each layer of the ANN. For each unique combination of at least two neural nodes in each layer, the method may further include determining a relative advantage value for one of the at least two neural nodes in a given layer with respect to remaining of the at least two neural nodes in the given layer based on actual inputs and standard inputs to the at least two neural nodes, and determining a modified weight of each of the at least two neural nodes based on the relative advantage value. The method may further include executing an elimination decision for each neural node in each layer based on a corresponding final modified weight. The final modified weight of a given neural node in a given layer is the modified weight of the given neural node upon exhausting each unique combination of the at least two neural nodes in the given layer. The method may further include updating the weight matrix based on the final modified weight of each remaining neural node in each layer.

In one embodiment, a system for improving performance of an ANN is disclosed. In one example, the system may include an ANN improvement device, which may include at least one processor and a memory communicatively coupled to the at least one processor. The memory may store processor-executable instructions, which, on execution, may cause the processor to receive a weight matrix comprising an original weight of each neural node in each layer of the ANN. For each unique combination of at least two neural nodes in each layer, the processor-executable instructions, on execution, may further cause the processor to determine a relative advantage value for one of the at least two neural nodes in a given layer with respect to remaining of the at least two neural nodes in the given layer based on actual inputs and standard inputs to the at least two neural nodes, and to determine a modified weight of each of the at least two neural nodes based on the relative advantage value. The processor-executable instructions, on execution, may further cause the processor to execute an elimination decision for each neural node in each layer based on a corresponding final modified weight. The final modified weight of a given neural node in a given layer is the modified weight of the given neural node upon exhausting each unique combination of the at least two neural nodes in the given layer. The processor-executable instructions, on execution, may further cause the processor to update the weight matrix based on the final modified weight of each remaining neural node in each layer.

In one embodiment, a non-transitory computer-readable medium storing computer-executable instructions for improving performance of an ANN is disclosed. In one example, the stored instructions, when executed by a processor, may cause the processor to perform operations including receiving a weight matrix comprising an original weight of each neural node in each layer of the ANN. For each unique combination of at least two neural nodes in each layer, the operations may further include determining a relative advantage value for one of the at least two neural nodes in a given layer with respect to remaining of the at least two neural nodes in the given layer based on actual inputs and standard inputs to the at least two neural nodes, and determining a modified weight of each of the at least two neural nodes based on the relative advantage value. The operations may further include executing an elimination decision for each neural node in each layer based on a corresponding final modified weight. The final modified weight of a given neural node in a given layer is the modified weight of the given neural node upon exhausting each unique combination of the at least two neural nodes in the given layer. The operations may further include updating the weight matrix based on the final modified weight of each remaining neural node in each layer.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
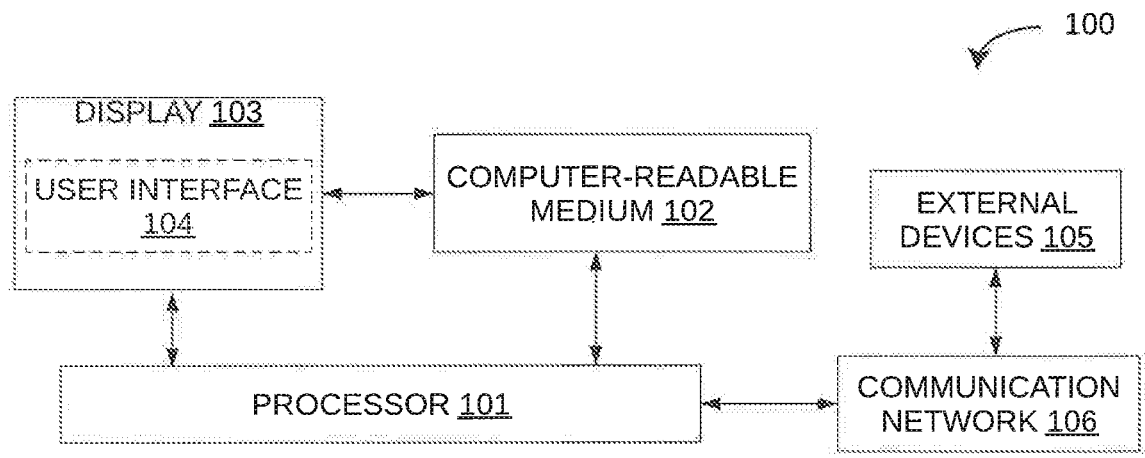
FIG. 1 is a block diagram of an exemplary system for improving performance of an artificial neural network (ANN), in accordance with some embodiments of the present disclosure.

Referring now to FIG. 1, an exemplary system 100 for improving performance of an artificial neural network (ANN) is illustrated, in accordance with some embodiments of the present disclosure. As will be appreciated, the system 100 may implement the ANN for a target application. Further, the system may implement the ANN improvement engine, in accordance with some embodiments of the present disclosure. The ANN improvement engine may improve performance of the ANN by minimizing a false positive in the ANN. In particular, the system 100 may include an ANN improvement device (for example, server, desktop, laptop, notebook, netbook, tablet, smartphone, mobile phone, or any other computing device) that may implement the ANN improvement engine. It should be noted that, in some embodiments, the ANN improvement engine may help in understanding the reason for the decisions taken by the ANN and, therefore, improve its performance by reducing the number of the false positives in the outcome.

As will be described in greater detail in conjunction with FIGS. 2-4, the ANN improvement engine may receive a weight matrix comprising an original weight of each neural node in each layer of the ANN. For each unique combination of at least two neural nodes in each layer, the ANN improvement engine may then determine a relative advantage value for one of the at least two neural nodes in a given layer with respect to remaining of the at least two neural nodes in the given layer based on an actual inputs and a standard inputs to the at least two neural nodes, and determine a modified weight of each of the at least two neural nodes based on the relative advantage value. The ANN improvement engine may then execute an elimination decision for each neural node in each layer based on a corresponding final modified weight. The final modified weight of a given neural node in a given layer is the modified weight of the given neural node upon exhausting each unique combination of the at least two neural nodes in the given layer. The ANN improvement engine may then update the weight matrix based on the final modified weight of each remaining neural node in each layer.

The system 100 may include one or more processors 101, a computer-readable medium (for example, a memory) 102, and a display 103. The computer-readable storage medium 102 may store instructions that, when executed by the one or more processors 101, cause the one or more processors 101 to improve performance of the ANN, in accordance with aspects of the present disclosure. The computer-readable storage medium 102 may also store various data (for example, weight matrix for the ANN, standard inputs, standard outputs, actual inputs, actual outputs, relative advantage value of each neural node with respect to remaining neural nodes in a layer of the ANN, a final modified weight for each neural nodes, updated weight matrix for the ANN, and the like) that may be captured, processed, and/or required by the system 100. The system 100 may interact with a user via a user interface 104 accessible via the display 103. The system 100 may also interact with one or more external devices 105 over a communication network 106 for sending or receiving various data. The external devices 105 may include, but may not be limited to, a remote server, a digital device, or another computing system.

Figure 2:
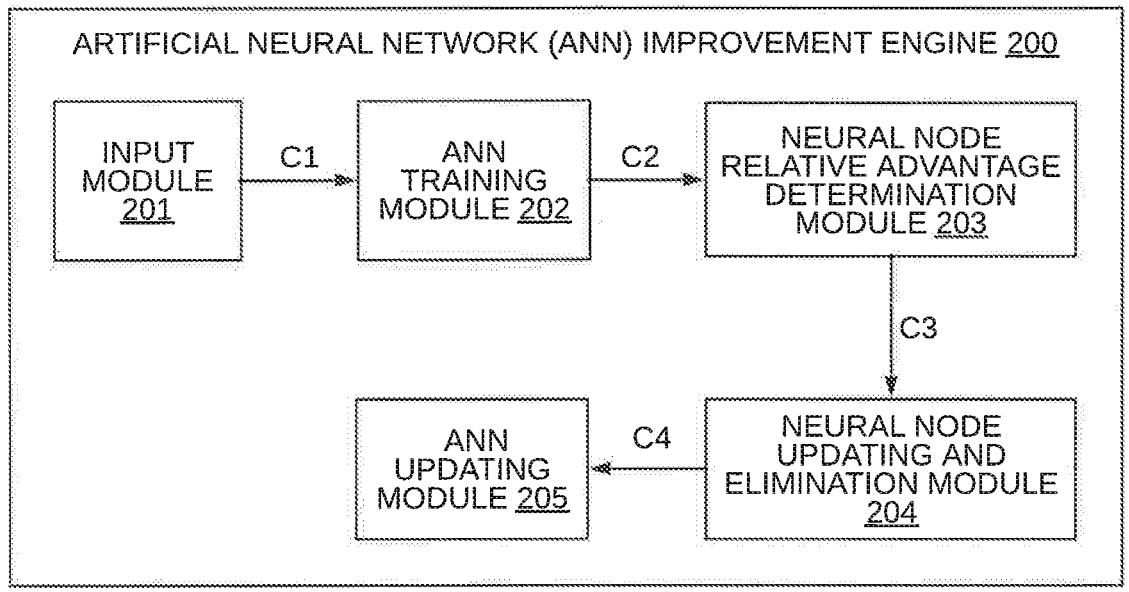
FIG. 2 is a functional block diagram of an ANN improvement engine, in accordance with some embodiments of the present disclosure.

Referring now to FIG. 2, a functional block diagram of an ANN improvement engine 200, implemented by the system 100 of FIG. 1, is illustrated, in accordance with some embodiments of the present disclosure. The ANN improvement engine 200 may include various modules that perform various functions so as to analyze and understand the decisions made by the ANN (i.e., the outcome of the ANN) and to modify the weights of the neural nodes for improving the performance of the ANN. In some embodiments, the ANN improvement engine 200 may include an input module 201, an ANN training module 202, a neural node relative advantage determination module 203, a neural node updating and elimination module 204, and an ANN updating module 205. As will be appreciated by those skilled in the art, all such aforementioned modules 201-205 may be represented as a single module or a combination of different modules. Moreover, as will be appreciated by those skilled in the art, each of the modules 201-205 may reside, in whole or in parts, on one device or multiple devices in communication with each other.

The input module 201 may receive input data for an ANN model. In some embodiments, the input data may be training data for training the ANN model. The input data may include, but may not be limited to, text data, image data, or the like. The input module 201 may convert the input data into a vectorized form, and then feed the vectorized data to the ANN training module 202.

The ANN training module 202 may receive the vectorized data (i.e., vectorized training data) from the input module 201 via a C1 interface using standard wired or wireless data transfer protocols. The ANN training module 202 may then build and train the ANN model with the vectorized data for a target application. The target application may include, but may not be limited to, computer vision, image recognition, natural language processing, speech recognition, decision making or the like. The ANN training module 202 may then generate a weight matrix comprising a weight of each neural node in each layer of the ANN. As will be appreciated, at this stage, the weights of neural nodes are original weights based on the training of the ANN model.

The neural node relative advantage determination module 203 may receive the weight matrix from the ANN training module 202 via a C2 interface using standard wired or wireless data transfer protocols. The neural node relative advantage determination module 203 may then determine a relative advantage value of each neural node in a given layer with respect to each of the other neural nodes in the given layer, for each layer of the ANN. Further, the neural node relative advantage determination module 203 may determine an impact of the relative advantage of the neural node on the output loss of the ANN. It should be noted that the relative comparative advantaged value of a neural node with respect to other neural nodes may be determined based on their weights (e.g., original weights or modified weights). In some embodiments, the neural node relative advantage determination module 203 may employ revealed comparative advantage (RCA) index in order to determine the relative advantage value of each neural node in the weight matrix.

The neural node updating and elimination module 204 may receive the relative comparative advantage value of each neural node from the neural node relative advantage determination module 203 via a C3 interface using standard wired or wireless data transfer protocols. As stated above, the relative comparative advantaged value of a neural node in a given layer may be with respect to each of the other neural nodes in the given layer. The neural node updating and elimination module 204 may then update the weight of a given neural node in a given layer based on its relative advantage value with respect to each of the other neural nodes in the given layer. In other words, neural node updating and elimination module 204 in conjunction with the neural node relative advantage determination module 203 may update the weight of a given neural node in a given layer by iteratively determining a modified weight of the given neural node based on its relative advantage value with each of the other neural nodes in the given layer. Thus, a final modified weight of a given neural node in a given layer is the modified weight of the given neural node upon exhausting each unique combination that the given neural node may have with other neural nodes in the given layer. The neural node updating and elimination module 204 may then execute an elimination decision for each neural node in each layer based on its final modified weight matrix. In some embodiments, the elimination may involve removing a given neural node for which the final modified weight is about zero or about same as the original weight since the given neural node is having negligible impact on the output of the ANN. In other words, the elimination may involve removing non-contributing neural nodes. As will be appreciated, the updated weights of the neural nodes may result in reduction in a false positives of the ANN, which, in turn, may result in improvement in the accuracy of the ANN. Further, as will be appreciated, elimination of non-contributing neural nodes from the ANN may result in reduction in computing complexity and time, which, in turn, may result in improvement in the efficiency of the ANN.

The ANN updating module 205 may receive final modified weights of the neural nodes from the neural node updating and elimination module 204 via a C4 interface using standard wired or wireless data transfer protocols. The ANN updating module 205 may then update the weight matrix of the ANN based on the final modified weights of remaining neural nodes. In some embodiments, the weight matrix is updated by replacing the original weight of each remaining neural node in each layer with the corresponding final modified weight. The updated weight matrix may then be employed for generating output of the ANN (i.e., performing predictions).

It should be noted that the ANN improvement engine 200 may be implemented in programmable hardware devices such as programmable gate arrays, programmable array logic, programmable logic devices, and so forth. Alternatively, the ANN improvement engine 200 may be implemented in software for execution by various types of processors. An identified engine of executable code may, for instance, include one or more physical or logical blocks of computer instructions which may, for instance, be organized as an object, procedure, function, module, or other construct.

Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for improving performance of an ANN. For example, the exemplary system 100 and the associated ANN improvement engine 200 may improve the performance of the ANN by the processes discussed herein. In particular, as will be appreciated by those of ordinary skill in the art, control logic and/or automated routines for performing the techniques and steps described herein may be implemented by the system 100 and the ANN improvement engine 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
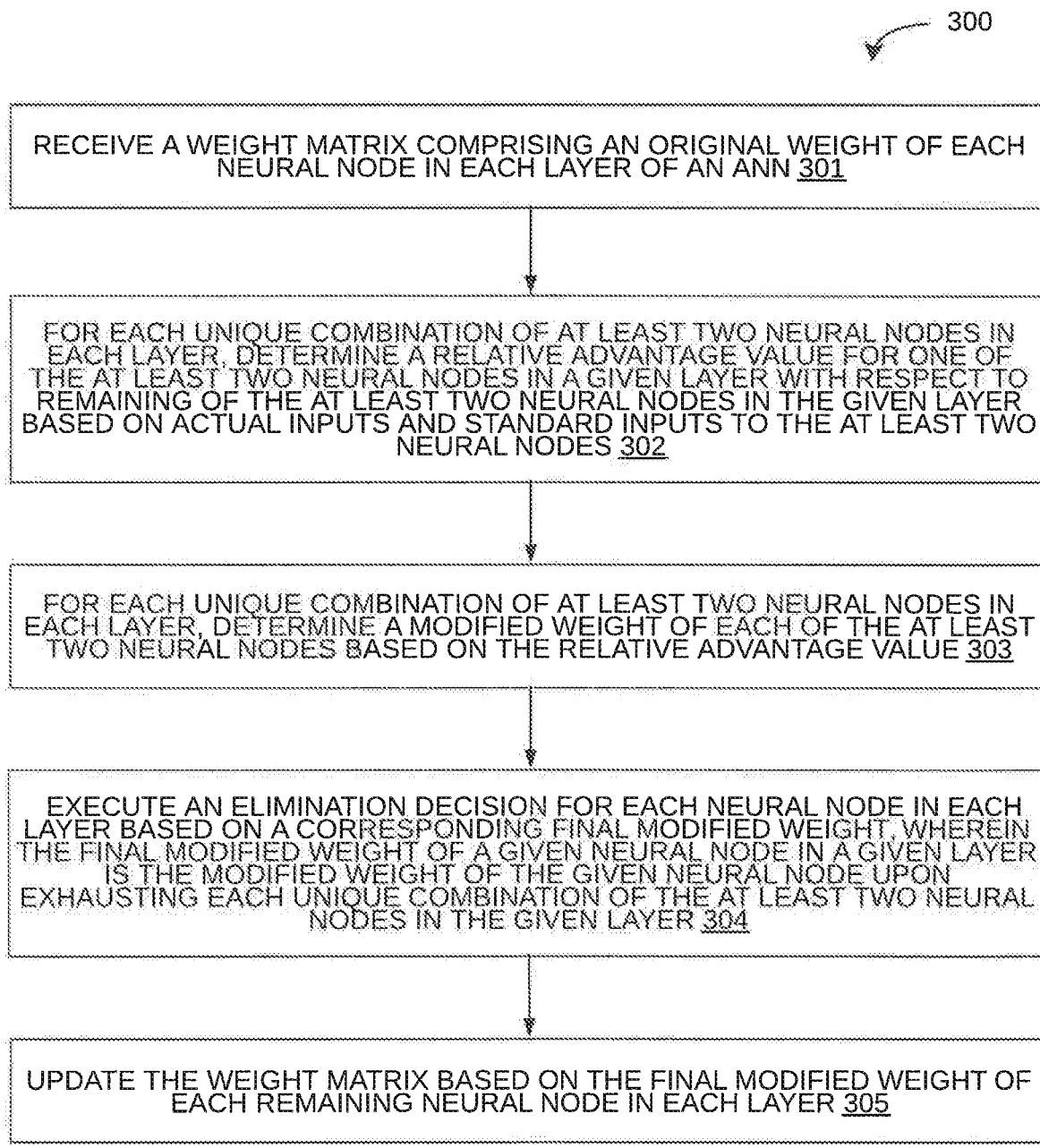
FIG. 3 is a flow diagram of an exemplary process for improving performance of an ANN, in accordance with some embodiments of the present disclosure.

For example, referring now to FIG. 3, exemplary control logic 300 for improving performance of an ANN via a system, such as the system 100, is depicted via a flowchart, in accordance with some embodiments of the present disclosure. As illustrated in the flowchart, the control logic 300 may include the steps of receiving a weight matrix comprising an original weight of each neural node in each layer of the ANN at step 301; determining, for each unique combination of at least two neural nodes in each layer, a relative advantage value for one of the at least two neural nodes in a given layer with respect to remaining of the at least two neural nodes in the given layer based on actual inputs and standard inputs to the at least two neural nodes at step 302; determining, for each unique combination of at least two neural nodes in each layer, a modified weight of each of the at least two neural nodes based on the relative advantage value at step 303. It should be noted that a final modified weight of a given neural node in a given layer is the modified weight of the given neural node upon exhausting each unique combination of the at least two neural nodes in the given layer. The control logic 300 may further include the steps of executing an elimination decision for each neural node in each layer based on a corresponding final modified weight at step 304; and updating the weight matrix based on the final modified weight of each remaining neural node in each layer at step 305. In some embodiments, the control logic 300 may further include the step of generating the weight matrix by building and training the ANN for a target application In some embodiments, determining the relative advantage value for the one of the at least two neural nodes in the given layer with respect to the remaining of the at least two neural nodes in the given layer at step 302 may include the steps of determining actual outputs and standard outputs of the at least two neural nodes for the actual inputs and standard inputs respectively based on the original weights or the modified weights of the at least two neural nodes; determining a relative advantage of the one of the at least two neural nodes with respect to the remaining of the at least two neural nodes by comparing the actual outputs and the standard outputs, each normalized with respect to the standard outputs or the actual outputs; and determining the relative advantage value based on a difference between the actual outputs normalized with respect to the standard outputs or the actual outputs. It should be noted that, in some embodiments, the at least two neural nodes comprises two neural nodes. Further, it should be noted that, in such embodiments, the relative advantage value comprises an average of the difference between the actual outputs normalized with respect to the standard outputs or the actual outputs.

Additionally, in some embodiments, determining the modified weight of each of the at least two neural nodes at step 303 comprises the steps of increasing an original or a previously modified weight of the one of the at least two neural nodes by a first value proportional to the relative advantage value, and decreasing an original or a previously modified of each of the remaining of the at least two neural nodes by a second value proportional to the relative advantage value. Further, in some embodiments, executing the elimination decision at step 304 comprises removing a given neural node for which the final modified weight is about zero or about same as the original weight. Moreover, in some embodiments, updating the weight matrix at step 305 comprises replacing the original weight of each remaining neural node in each layer with the corresponding final modified weight.

Figure 4:
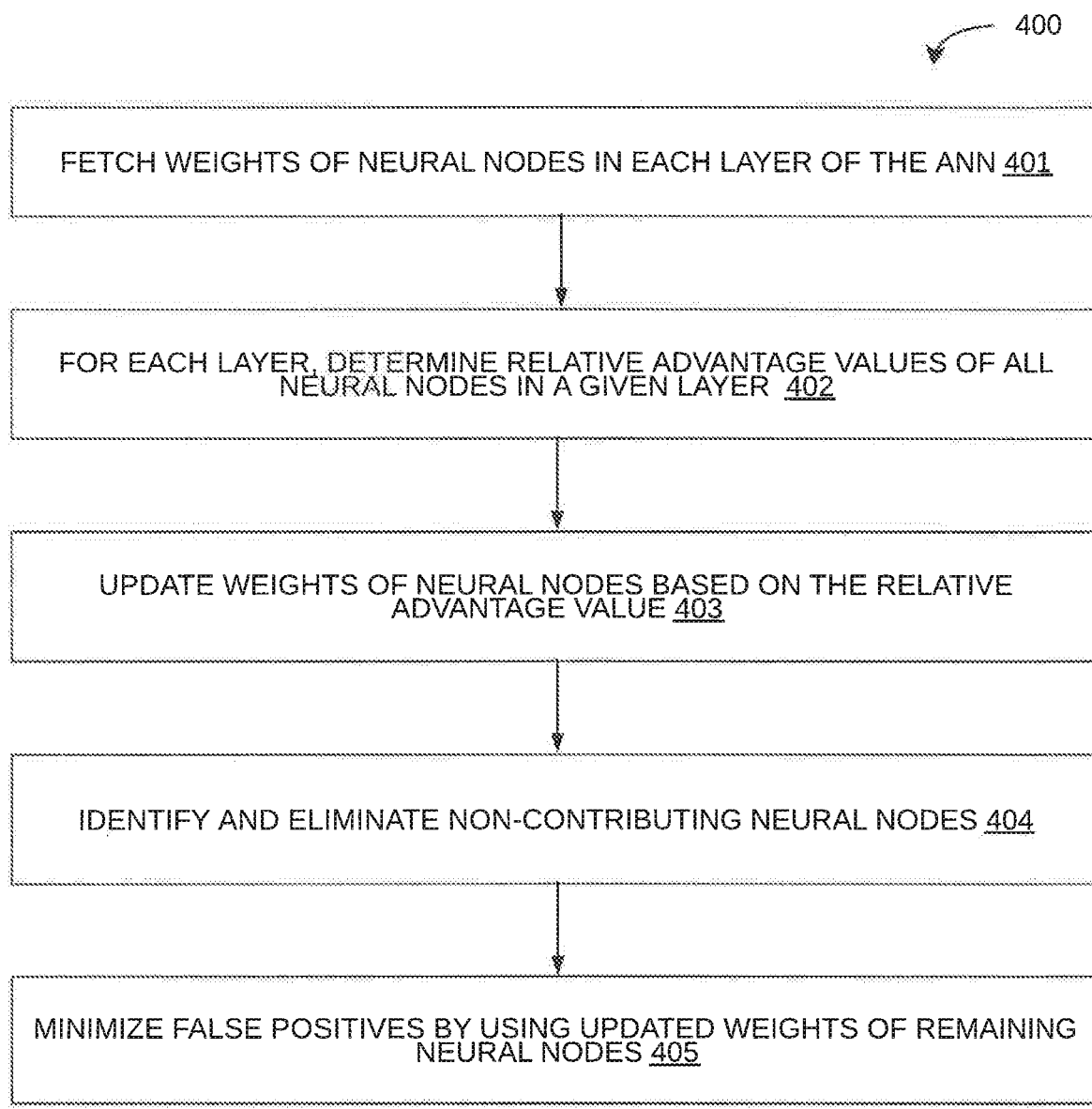
FIG. 4 is a flow diagram of a detailed exemplary process for improving performance of an ANN, in accordance with some embodiments of the present disclosure.

Referring now to FIG. 4, exemplary control logic 400 for improving performance of an ANN is depicted in greater detail via a flowchart, in accordance with some embodiments of the present disclosure. As illustrated in the flowchart, at step 401, the control logic 400 may fetch weights of neural nodes in each layer of the ANN in form of a weight matrix. As stated above, the ANN may be built and trained for a target application, using the ANN training module 202, so as to generate the weight matrix. The weight matrix may include an original weight of each neural node in each layer of the ANN.

At step 402, the control logic 400 may determine, for each layer, a relative advantage value of each of the neural nodes in a given layer based on the weights of the neural nodes in the given layer using a neural node relative advantage determination module 203. The relative advantage of each neural nodes of the ANN based on its weight in the weight matrix is computed. A neural node in given layer is compared with other neural nodes in the given layer, one after the other. It should be noted that, in some embodiments, the relative advantage value may be determined using 'Balassa Index'. For example, the weight of each of the neural nodes being compared may be multiplied with actual input so as to determine the actual output, and with standard or reference input (e.g., unit input) so as to determine standard output. Further, both the actual outputs and the standard outputs for the neural nodes being compared may be divided by one of the standard outputs or the actual inputs, and the resultant values may be compared to determine the relative advantage of one neural node over other neural nodes. Further, the relative advantage value of one neural node over other neural nodes may be based on a difference in the resultant values. For example, in case of a comparison between two neural nodes, the relative advantage value of one neural node over another neural node may be an average of the difference between the resultant values of the two neural nodes.

At step 403, the control logic 400 may update weights of neural nodes based on the relative advantage value using a neural node updating and elimination module 204. A modified weight of each of the neural nodes being compared may be determined based on the relative advantage value. It should be noted that the modified weight of a given neural node in a given layer is iteratively determined based on its relative advantage value with each of the other neural nodes in the given layer. In other words, steps 402 and 403 may be repeated for each unique comparison of the given neural node with the other neural nodes in the given layer (i.e., each unique combination of two or more neural nodes in a given layer). A final modified weight of a given neural node in a given layer is the modified weight of the given neural node upon exhausting each unique combination that the given neural node may have with other neural nodes in the given layer.

In some embodiments, the modified weight of a given neural node is determined by increasing or decreasing original or previously modified weight of the given neural node by a value proportional to the relative advantage or disadvantage respectively. Contemporaneously, the modified weights of other neural nodes being compared with the given neural node are determined by increasing or decreasing original or previously modified weights of the other neural nodes by values proportional to their relative advantage or disadvantage respectively. For example, in case of two neural nodes, if one neural node has a relative advantage with respect to the other, the relative advantage value is added to an original or a previously modified weight of neural node having the relative advantage and is subtracted from the original or the previously modified of the neural node having the relative disadvantage.

At step 404, the control logic 400 may identify and eliminate non-contributing neural nodes using the neural node updating and elimination module 204. As will be appreciated, non-contributing neural nodes may be neural nodes with no or negligible contribution to the output of the ANN, and may be identified based on their final modified weights. In some embodiments, neural nodes having final modified weights as about zero or as about same as their original weights may be considered as non-contributing neural nodes, and such neural nodes may be, therefore, removed from the ANN as they may not impact the output of the ANN. Further, as will be appreciated, by removing the non-contributing neural nodes, the performance of the ANN may increase as the computation time may reduce.

At step 405, the control logic 400 may minimize false positives in the ANN by using updated weights of remaining neural nodes. The weight matrix of the ANN may be updated based on the final modified weight of each remaining neural node in each layer of the ANN, using the ANN updating module 205. In other words, the original weight of each remaining neural node in each layer may be replaced with the corresponding final modified weight. The updated weight matrix may then be employed to determine the output of the ANN, thereby reducing false positives and increasing accuracy in the ANN output.

By way of an example, an ANN may be a basic single layer binary classifier with two classes A and B such that class A is represented by output '0' while class B is represented by output '1'. The output vector is of length '4' corresponding to four neural nodes n1, n2, n3, and n4 having respective weights 1.1, 0.2, 0.3, and 1.4. Further, ReLu may be the activation function (x=max(0, x)) and the average of the output vector is used to determine the final output value. Thus, if the given input data is of class A and the output value is 0.6, then the classifier will predict it as 1 (i.e., belonging to class B). This is a false positive output. The ANN improvement device 101 may then improve the ANN as follows:

For example,

Input vector = [1.1, 0.3, 2.4, 0.3]

Original weights of Neural Nodes (i.e., weight matrix) =

[1.1, 0.2, 0.3, 1.4]

Actual output = $Avg$(Input vector $*$ Weights of Neural Nodes)
  = $Avg$([1.1$*$1.1, 0.3$*$0.2, 2.4$*$0.3, 0.3$*$1.4])
  = $Avg$([$ReLu$(1.21), $ReLu$(0.06), $ReLu$(0.72), $ReLu$(0.42)]
  = $Avg$([1.21, 0.06, 0.72, 0.42])
  == 0.6~1

Expected output = 0

Output Loss = Expected output − Actual output = |0 − 0.6| = 0.06

To reduce the false positive output, the relative advantage value of all the neural nodes may be employed. As discussed above, the determination of the relative advantage value may involve two steps: a) calculating the relative advantage value of all the neural nodes, and b) finding the neural nodes without any impact. For example, the ANN may determine the relative advantage of neural nodes n1 with respect to the remaining neural nodes n2, n3, and n4. The possible combinations of n1 may include (n1, n2), (n1, n3), and (n1, n4). Further, other possible combinations in the ANN may include (n2, n3), (n2, n4), and (n3, n4). The relative advantage values and the final modified weights may be determined as follows:

For example,
Input vector=[1.1, 0.3, 2.4, 0.3]
Standard Input Vector=[1, 1. 1, 1]
Original weights of Neural Nodes (i.e., weight matrix)= [1.1, 0.2, 0.3, 1.4]

| Neural Nodes (n1, n2) | Standard Output (standard input * weight) | Actual Output (actual input * weight) |
|---|---|---|
| n1 | 1 * 1.1 = 1.1 | 1.1 * 1.1 = 1.21 |
| n2 | 1 * 0.2 = 0.2 | 0.3 * 0.2 = 0.06 |

Now, dividing both the standard output and actual output of each neural node by one of the standard output or the actual output of respective neural node, the ANN improvement device 101 may determine the neural node having more advantage with respect to their weight. In other words, each of the standard outputs and the actual outputs may be normalized with respect to respective standard outputs or actual outputs. For example, normalized output values (i.e., resultant values) for neural nodes (n1, n2) with respect to the standard outputs (i.e., standard outputs as normalization parameters) are as follows:
  Normalized standard output for n1=standard output/standard output=1.1/1.1=1,
  Normalized actual output for n1=actual output/standard output=1.21/1.1=1.1
  Normalized standard output for n2=standard output/standard output=0.2/0.2=1,
  Normalized actual output for n2=actual output/standard output=0.06/0.2=0.3
Upon comparing the normalized output values (i.e., the resultant values), it may be said that n2 has the relative advantage compared to n1 since n2 consumes less resource than n1 for producing about same output. In other words, n2 has the relative advantage compared to n1 because n2 consumes 0.3 units for producing 1 unit while n1 consumes 1.1 unit for producing 1 unit.

Further, the relative advantage value may be calculated as a difference between the normalized output values (i.e., the resultant values) as follows:

The relative advantage value=(1.1−0.3)/2=0.8/2=0.4.

Now, since n2 has the relative advantage over n1, the relative advantage value may be added to weight of n2 and subtracted from weight of n1 so as to get their modified weights as below:
(n1, n2)=n2 has advantage over n1=0.4

$n1$=1.1−0.4=0.7

$n2$=0.2+0.4=0.6

Similarly, the relative advantage value of all the possible combination neural nodes (i.e., (n1, n3), (n1, n4), (n2, n3), (n2, n4), and (n3, n4)) may be calculated and modified weights of neural nodes may be determined as follows:
(n1, n3)=n1 has advantage over n3=1.3/2=0.65

$n1$=0.7+0.65=1.35

$n3$=0.3−0.65=−0.35

(n1, n4)=n4 has advantage over n1=0.8/2=0.4

$n1$=1.35−0.4=0.95

$n4$=1.4+0.4=1.8

(n2, n3)=n2 has advantage over n3=2.1/2=1.05

$n2$=0.6+1.05=1.65

$n3$=−0.35−1.05=−1.4

(n2, n4)=both n2 and n4 values are same
(n3, n4)=n4 has advantage over n3=2.1/2=1.05

$n3$=−1.4−1.05=−2.45

$n4$=1.8+1.05=2.85

When the weight of a neural node is about zero or when the weight of a neural node does not change after determining all the relative advantages, then the neural node may not have any impact on the output of the ANN and may be, therefore, removed by making its value zero.

The weights of neural nodes may be then updated with their modified weights. The updated weights of neural nodes may then be employed to improve the performance of the ANN by minimizing false positives in the outcome. For example, Input vector = [1.1, 0.3, 2.4, 0.3]

Updated weights of Neural Nodes (i.e., updated weight matrix) =

[0.95, 1.65, −2.45, 2.85]

Actual output = $Avg$(Input vector $*$ Weights of Neural Nodes)
  = $Avg$([1.1$*$0.95, 0.3$*$1.65, 2.4$*$−2.45, 0.3$*$2.85])
  = $Avg\left(\begin{bmatrix} ReLu(1.045), ReLu(0.495), \\ ReLu(-5.88), ReLu(0.855) \end{bmatrix}\right)$
  = $Avg$([1.045, 0.495, 0, 0.855])
  == 0.49~0

Expected output = 0

Output Loss = Expected output − Actual output = |0 − 0.49| = 0.49

Thus, by using the updated weight matrix, the loss is reduced from 0.6 to 0.49 and the false positives are also reduced.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
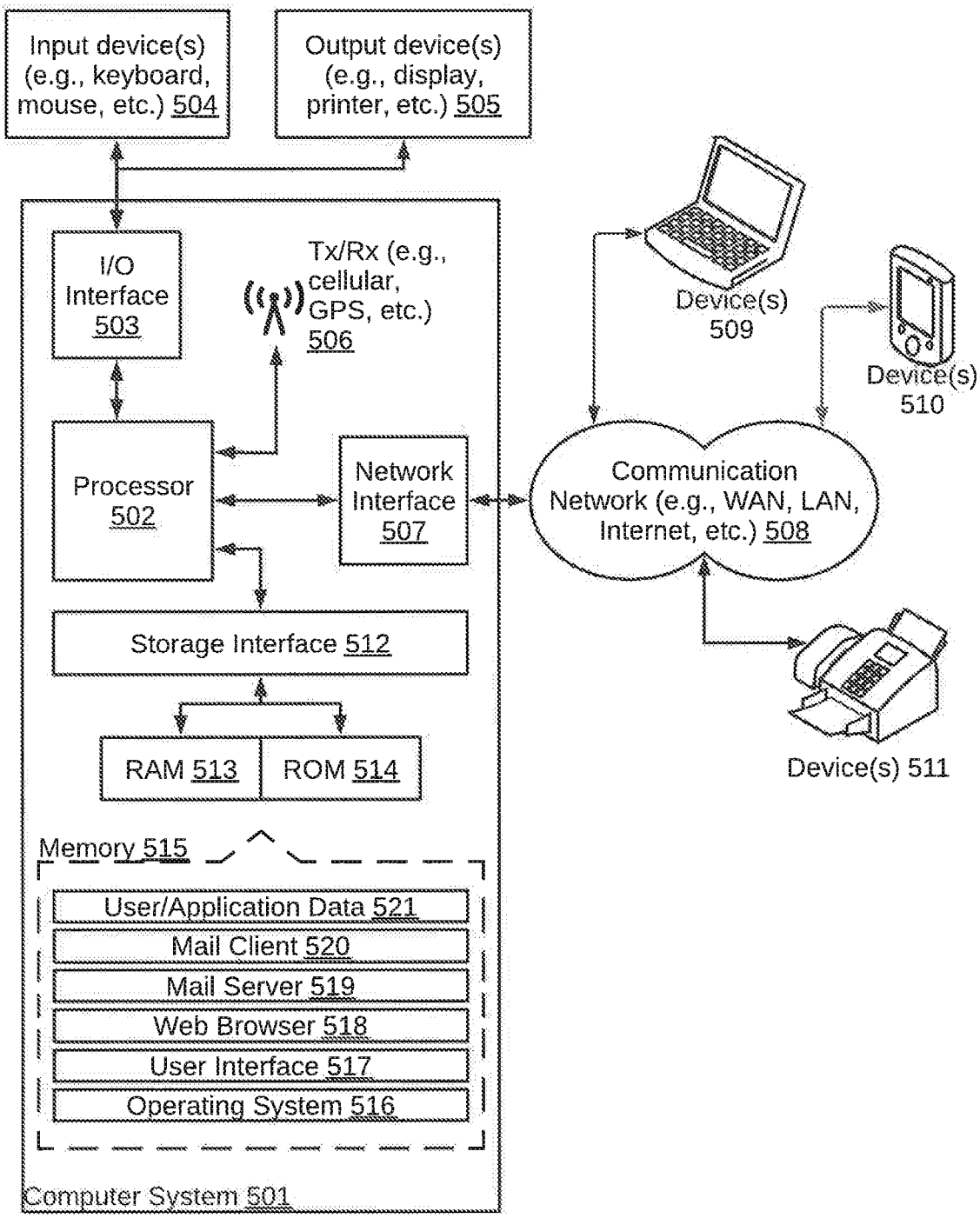
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing system 100 for improving performance of an ANN. Computer system 501 may include a central processing unit ("CPU" or "processor") 502. Processor 502 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL CORE® processor, ITANIUM® processor, XEON® processor, CELERON® processor or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n /b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, Infini-Band, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 501 may implement a web browser 518 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 501 may implement a mail server 519 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 501 may implement a mail client 520 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 501 may store user/application data 521, such as the data, variables, records, etc. (e.g., weight matrix for the ANN, standard inputs, standard outputs, actual inputs, actual outputs, relative advantage value of each neural node with respect to the remaining neural nodes in a layer of the ANN, a final modified weight for each neural nodes, updated weight matrix for the ANN, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above are not routine, or conventional, or well understood in the art. The techniques discussed above provide for improving performance of an ANN by reducing the number of false positives in the outcome of the ANN. In particular, the techniques discussed above provide for minimizing false positives in the ANN by using revealed comparative advantage (RCA) values. The RCA values of neural nodes help in understanding the reason for the decisions taken by the ANN and, therefore, help in improving the efficiency of the ANN. Additionally, techniques described in the various embodiments discussed above provide for improvement in the execution time of the ANN as the neural nodes which have no or negligible contribution to the output are removed. Further, the techniques described above may be employed in any kind of ANN including, but not limited to, deep neural network (DNN) such as recurrent neural network (RNN), convolutional neural network (CNN), or the like. Moreover, the techniques may be easily deployed in any cloud based servers for access and use as an 'application as a service' by any computing device including mobile device. For example, the ANN improvement engine may be implemented on a cloud based server and used for improving performance of various ANN based mobile device applications.

The specification has described method and system for improving performance of an ANN. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), readonly memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of improving performance of an artificial neural network (ANN), the method comprising:
   receiving, by an ANN improvement device, a weight matrix comprising an original weight of each neural node in each layer of the ANN;
   for each unique combination of at least two neural nodes in each layer,
      determining, by the ANN improvement device, a relative advantage value for one of the at least two neural nodes in a given layer with respect to remaining of the at least two neural nodes in the given layer based on actual inputs and standard inputs to the at least two neural nodes; and
      determining, by the ANN improvement device, a modified weight of each of the at least two neural nodes based on the relative advantage value, wherein determining the modified weight of each of the at least two neural nodes comprises:
      increasing an original or a previously modified weight of the one of the at least two neural nodes by a first value proportional to the relative advantage value; and
      decreasing an original or a previously modified of each of the remaining of the at least two neural nodes by a second value proportional to the relative advantage value;
   executing, by the ANN improvement device, an elimination decision for each neural node in each layer based on a corresponding final modified weight, wherein the final modified weight of a given neural node in a given layer is the modified weight of the given neural node upon exhausting each unique combination of the at least two neural nodes in the given layer;
   updating, by the ANN improvement device, the weight matrix based on the final modified weight of each remaining neural node in each layer; and
   applying the ANN to an image recognition.

2. The method of claim 1, further comprising generating the weight matrix by building and training the ANN for a target application.

3. The method of claim 1, wherein determining the relative advantage value for the one of the at least two neural nodes in the given layer with respect to the remaining of the at least two neural nodes in the given layer comprises:
   determining actual outputs and standard outputs of the at least two neural nodes for the actual inputs and standard inputs respectively based on the original weights or the modified weights of the at least two neural nodes;
   determining a relative advantage of the one of the at least two neural nodes with respect to the remaining of the at least two neural nodes by comparing the actual outputs and the standard outputs, each normalized with respect to one of the standard outputs or the actual outputs; and
   determining the relative advantage value based on a difference between the actual outputs, normalized with respect to the one of the standard outputs or the actual outputs.

4. The method of claim 3, wherein the at least two neural nodes comprises two neural nodes, and wherein the relative advantage value comprises an average of the difference between the actual outputs, normalized with respect to the one of the standard outputs or the actual outputs.

5. The method of claim 1, wherein executing the elimination decision comprises removing a given neural node for which the final modified weight is about zero or about same as the original weight.

6. The method of claim 1, wherein updating the weight matrix comprises replacing the original weight of each remaining neural node in each layer with the corresponding final modified weight.

7. A system for improving performance of an artificial neural network (ANN), the system comprising:
   an ANN improvement device comprising at least one processor and a computer-readable medium storing instructions that, when executed by the at least one processor, cause the at least one processor to perform operations comprising:
   receiving a weight matrix comprising an original weight of each neural node in each layer of the ANN;
   for each unique combination of at least two neural nodes in each layer,
      determining a relative advantage value for one of the at least two neural nodes in a given layer with respect to remaining of the at least two neural nodes in the given layer based on actual inputs and standard inputs to the at least two neural nodes; and
      determining a modified weight of each of the at least two neural nodes based on the relative advantage value, wherein determining the modified weight of each of the at least two neural nodes comprises:
      increasing an original or a previously modified weight of the one of the at least two neural nodes by a first value proportional to the relative advantage value; and
      decreasing an original or a previously modified of each of the remaining of the at least two neural nodes by a second value proportional to the relative advantage value;
   executing an elimination decision for each neural node in each layer based on a corresponding final modified weight, wherein the final modified weight of a given neural node in a given layer is the modified weight of the given neural node upon exhausting the each unique combination of at least two neural nodes in the given layer;
   updating the weight matrix based on the final modified weight of each remaining neural node in each layer; and
   applying the ANN to an image recognition.

8. The system of claim 7, wherein the operations further comprise generating the weight matrix by building and training the ANN for a target application.

9. The system of claim 7, wherein determining the relative advantage value for the one of the at least two neural nodes in the given layer with respect to the remaining of the at least two neural nodes in the given layer comprises:
   determining actual outputs and standard outputs of the at least two neural nodes for the actual inputs and standard inputs respectively based on the original weights or the modified weights of the at least two neural nodes;
   determining a relative advantage of the one of the at least two neural nodes with respect to the remaining of the at least two neural nodes by comparing the actual outputs and the standard outputs, each normalized with respect to one of the standard outputs or the actual outputs; and determining the relative advantage value based on a difference between the actual outputs, normalized with respect to the one of the standard outputs or the actual outputs.

10. The system of claim 9, wherein the at least two neural nodes comprises two neural nodes, and wherein the relative advantage value comprises an average of the difference between the actual outputs, normalized with respect to the one of the standard outputs or the actual outputs.

11. The system of claim 7, wherein executing the elimination decision comprises removing a given neural node for which the final modified weight is about zero or about same as the original weight.

12. The system of claim 7, wherein updating the weight matrix comprises replacing the original weight of each remaining neural node in each layer with the corresponding final modified weight.

13. A non-transitory computer-readable medium storing computer-executable instructions for improving performance of an artificial neural network (ANN), the computer-executable instructions configured for:

receiving a weight matrix comprising an original weight of each neural node in each layer of the ANN;

for each unique combination of at least two neural nodes in each layer, determining a relative advantage value for one of the at least two neural nodes in a given layer with respect to remaining of the at least two neural nodes in the given layer based on actual inputs and standard inputs to the at least two neural nodes; and determining a modified weight of each of the at least two neural nodes based on the relative advantage value, wherein determining the modified weight of each of the at least two neural nodes comprises:

increasing an original or a previously modified weight of the one of the at least two neural nodes by a first value proportional to the relative advantage value: and decreasing an original or a previously modified of each of the remaining of the at least two neural nodes by a second value proportional to the relative advantage value;

executing an elimination decision for each neural node in each layer based on a corresponding final modified weight, wherein the final modified weight of a given neural node in a given layer is the modified weight of the given neural node upon exhausting each unique combination of the at least two neural nodes in the given layer;

updating the weight matrix based on the final modified weight of each remaining neural node in each layer; and applying the ANN to an image recognition.

14. The non-transitory computer-readable medium of claim 13, wherein determining the relative advantage value for the one of the at least two neural nodes in the given layer with respect to the remaining of the at least two neural nodes in the given layer comprises:

determining actual outputs and standard outputs of the at least two neural nodes for the actual inputs and standard inputs respectively based on the original weights or the modified weights of the at least two neural nodes;

determining a relative advantage of the one of the at least two neural nodes with respect to the remaining of the at least two neural nodes by comparing the actual outputs and the standard outputs, each normalized with respect to one of the standard outputs or the actual outputs; and determining the relative advantage value based on a difference between the actual outputs, normalized with respect to the one of the standard outputs or the actual outputs.

15. The non-transitory computer-readable medium of claim 14, wherein the at least two neural nodes comprises two neural nodes, and wherein the relative advantage value comprises an average of the difference between the actual outputs, normalized with respect to the one of the standard outputs or the actual outputs.

16. The non-transitory computer-readable medium of claim 13, wherein executing the elimination decision comprises removing a given neural node for which the final modified weight is about zero or about same as the original weight.

17. The non-transitory computer-readable medium of claim 13, wherein updating the weight matrix comprises replacing the original weight of each remaining neural node in each layer with the corresponding final modified weight.

* * * * *